US012154509B2

(12) United States Patent
Wu et al.

(10) Patent No.: US 12,154,509 B2
(45) Date of Patent: Nov. 26, 2024

(54) PIXEL DRIVING CIRCUIT, DISPLAY PANEL, AND DRIVING METHOD OF PIXEL DRIVING CIRCUIT

(71) Applicant: Shenzhen China Star Optoelectronics Semiconductor Display Technology Co., Ltd., Guangdong (CN)

(72) Inventors: Yi Wu, Guangdong (CN); Shijian Bao, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/089,603

(22) Filed: Dec. 28, 2022

(65) Prior Publication Data

US 2024/0135883 A1 Apr. 25, 2024
US 2024/0233647 A9 Jul. 11, 2024

(30) Foreign Application Priority Data

Oct. 25, 2022 (CN) ........................ 202211327113.3

(51) Int. Cl.
*G09G 3/3258* (2016.01)
*G09G 3/32* (2016.01)
*G09G 3/3266* (2016.01)

(52) U.S. Cl.
CPC ............. *G09G 3/3258* (2013.01); *G09G 3/32* (2013.01); *G09G 3/3266* (2013.01); *G09G 2310/0267* (2013.01); *G09G 2310/061* (2013.01); *G09G 2320/0209* (2013.01); *G09G 2320/0233* (2013.01)

(58) Field of Classification Search
CPC ............... G09G 3/3258; G09G 3/3266; G09G 2320/0233; G09G 3/3233
See application file for complete search history.

(56) References Cited

U.S. PATENT DOCUMENTS

2018/0190194 A1* 7/2018 Zhu ......................... H01L 27/12
2020/0144352 A1* 5/2020 Lee ....................... H10K 59/123
2023/0119632 A1* 4/2023 Kwon .................. G09G 3/3233
345/690

FOREIGN PATENT DOCUMENTS

| | | |
|---|---|---|
| CN | 106920508 | 7/2017 |
| CN | 107301845 | 10/2017 |
| CN | 109584804 | 4/2019 |
| CN | 111261109 | 6/2020 |
| CN | 111540315 | 8/2020 |
| CN | 113192462 | 7/2021 |

OTHER PUBLICATIONS

Notification of Office Action and Search Report Dated May 29, 2023 From the State Intellectual Property Office of the People's Republic of China Re. Application No. 202211327113.3 and its Translation Into English. (23 Pages).

* cited by examiner

*Primary Examiner* — Dennis P Joseph

(57) ABSTRACT

A pixel driving circuit, a display panel and a driving method of the pixel driving circuit are provided by the present disclosure. The pixel driving circuit includes a driving transistor, a reset module, a writing module, a first control module, and a light emitting device. The pixel driving circuit with the 5T2C structure can compensate the threshold voltage drift of the driving transistor, improve the luminous uniformity of the light emitting device, and further improve the image quality.

9 Claims, 7 Drawing Sheets

PIXEL DRIVING CIRCUIT, DISPLAY PANEL, AND DRIVING METHOD OF PIXEL DRIVING CIRCUIT

RELATED APPLICATION

This application claims the benefit of priority of Chinese Patent Application No. 202211327113.3 filed on Oct. 25, 2022, the contents of which are incorporated herein by reference in their entirety.

TECHNICAL FIELD

The present disclosure relates to the field of display, in particular to a pixel driving circuit, a display panel, and a driving method of the pixel driving circuit.

BACKGROUND

Most of transistors in existing pixel driving circuits are low temperature polysilicon thin film transistors or oxide thin film transistors. Compared with conventional amorphous silicon thin film transistors, the low temperature polysilicon thin film transistors and the oxide thin film transistors have higher mobility and more stable characteristics, and are more suitable for active matrix organic light emitting diode displays.

However, due to limitation of crystallization process, the low temperature polysilicon thin film transistors made on large area glass substrates often have non-uniformity in electrical parameters such as threshold voltage and mobility, and so on. The non-uniformity will be transformed into driving current differences and brightness differences of organic light emitting diode devices, which will be perceived by human eyes, that is, it is a phenomenon of color non-uniformity. Although a process uniformity of the oxide thin film transistor is good, it is similar to the amorphous silicon thin film transistors. Under a long-term biasing and a high temperature, a threshold voltage of the oxide thin film transistor will drift, which will lead to different display quality. Because of different threshold drift of thin film transistors in different parts of a display panel, it will cause different brightness and uneven display of light-emitting devices.

SUMMARY

The present disclosure provides a pixel driving circuit, a display panel, and a driving method of the pixel driving circuit to compensate a threshold voltage drift of a driving transistor, to improve a luminous uniformity of a light emitting device, and further to improve an image quality.

In a first aspect, the disclosure provides a pixel driving circuit. The pixel driving circuit includes a driving transistor, a reset module, a writing module, a first control module, and a light emitting device. A gate electrode of the driving transistor is electrically connected to a first node, a first electrode of the driving transistor is electrically connected to a second node, and a second electrode of the driving transistor is electrically connected to a third node. The reset module is electrically connected to a first scanning signal terminal, a second scanning signal terminal, a first reset signal terminal, and a second reset signal terminal respectively. The reset module is further electrically connected to the first node and the third node and is configured to reset the first node and the third node. The writing module is respectively connected to a data signal terminal and a third scanning signal terminal. The writing module is further electrically connected to the third node and is configured to output a data signal to the third node. The first control module is connected to a first control signal terminal, is electrically connected to the third node and the fourth node, and is configured to control a conduction or a disconnection between the third node and the fourth node. A first terminal of the light emitting device is electrically connected to a fourth node, and a second terminal of the light emitting device is electrically connected to a first power supply terminal.

Optionally, in an embodiment of the present disclosure, the reset module includes a first transistor, a second transistor, and a first capacitor. A gate electrode of the first transistor is electrically connected to the first scanning signal terminal, a first electrode of the first transistor is electrically connected to the first reset signal terminal, and a second electrode of the first transistor is electrically connected to the first node. A gate electrode of the second transistor is electrically connected to the second scanning signal terminal, a first electrode of the second transistor is electrically connected to the second reset signal terminal, and a second electrode of the second transistor is electrically connected to the third node. A first terminal of the first capacitor is electrically connected to the first node, and a second terminal of the first capacitor is electrically connected to the third node.

Optionally, in an embodiment of the present disclosure, the writing module includes a third transistor and a second capacitor. A gate electrode of the third transistor is electrically connected to the third scanning signal terminal, a first electrode of the third transistor is electrically connected to the data signal terminal, and a second electrode of the third transistor is electrically connected to a first terminal of the second capacitor. A second terminal of the second capacitor is electrically connected to the third node.

Optionally, in an embodiment of the present disclosure, the pixel driving circuit further includes a second control module. The second control module is electrically connected to a fourth scanning signal end and a reference signal terminal, is electrically connected to the first terminal of the second capacitor, and is configured to prolong time for compensating a threshold voltage of the driving transistor.

Optionally, in an embodiment of the present disclosure, the second control module includes a fourth transistor. A gate of the fourth transistor is electrically connected to the fourth scanning signal terminal, a first electrode of the fourth transistor is electrically connected to the reference signal terminal, and a second electrode of the fourth transistor is electrically connected to the first terminal of the second capacitor.

Optionally, in an embodiment of the present disclosure, the first control module includes a fifth transistor. A gate of the fifth transistor is electrically connected to the first control signal terminal, a first electrode of the fifth transistor is electrically connected to the third node, and a second electrode of the fifth transistor is electrically connected to the fourth node.

Optionally, in an embodiment of the present disclosure, the pixel driving circuit further includes a third control module. The third control module is electrically connected to the second control signal terminal, is electrically connected to a second power supply terminal and the second node, and is configured to control a conduction or a disconnection between the second power supply terminal and the second node.

Optionally, in an embodiment of the present disclosure, the third control module includes a sixth transistor. A gate of the sixth transistor is electrically connected to the second control signal terminal, a first electrode of the sixth transistor is electrically connected to the second power supply terminal, and a second electrode of the sixth transistor is electrically connected to the second node.

A driving method of the pixel drive circuit, which is configured to drive the pixel drive circuit as described above, is further provided. The driving method includes: in a reset phase, resetting the first node according to a first reset signal under a control of a first scanning signal and resetting the third node according to a second reset signal under a control of a second scanning signal by the reset module; in a compensation phase, continuously outputting the first reset signal to the first node by means of the reset module under the control of the first scanning signal to make a voltage difference between the first node and the third node to be larger than the threshold voltage of the driving transistor, so as to turn on the driving transistor and to charge the third node by the second power supply terminal until the voltage difference between the first node and the third node is equal to the threshold voltage of the driving transistor; in a data writing phase, outputting the data signal to the third node by means of the writing module under the control of the third scanning signal; and in a light emitting phase, emitting light by means of the light emitting device.

Optionally, in an embodiment of the present disclosure, the first scanning signal and the third scanning signal are the same signal.

Optionally, in an embodiment of the present disclosure, the data signal comprises a first potential and a second potential, the data signal is switched from the first potential to the second potential in the reset phase, and the data signal is switched from the second potential to the first potential in the data writing phase.

On another hand, a display panel is further provided by the present disclosure. The display panel includes a plurality of pixels arranged in an array, and each of the pixels includes the pixel driving circuit described above.

The disclosure provides a pixel driving circuit, a display panel, and a driving method of the pixel driving circuit, and the pixel driving circuit includes a driving transistor, a reset module, a writing module, a first control module, and a light emitting device. A gate electrode of the driving transistor is electrically connected to a first node, a first electrode of the driving transistor is electrically connected to a second node, and a second electrode of the driving transistor is electrically connected to a third node. The reset module is electrically connected to a first scanning signal terminal, a second scanning signal terminal, a first reset signal terminal, and a second reset signal terminal respectively. The reset module is further electrically connected to the first node and the third node and is configured to reset the first node and the third node. The writing module is respectively connected to a data signal terminal and a third scanning signal terminal. The writing module is further electrically connected to the third node and is configured to output a data signal to the third node. The first control module is connected to a first control signal terminal, is electrically connected to the third node and the fourth node, and is configured to control a conduction or a disconnection between the third node and the fourth node. A first terminal of the light emitting device is electrically connected to a fourth node, and a second terminal of the light emitting device is electrically connected to a first power supply terminal. The pixel driving circuit may compensate the threshold voltage drift of the driving transistor, improve the luminescence uniformity of the light emitting device, and further improve the image quality.

BRIEF DESCRIPTION OF DRAWINGS

In order to more clearly explain the technical proposal in the embodiment of the present disclosure, drawings required to be used in the description of embodiments will be briefly described below, and it will be apparent that the drawings described below correspond only to some embodiments of the present disclosure, from which other drawings may be obtained without creative effort by those skilled in the art.

DETAILED DESCRIPTION

Technical proposals in the embodiment of the present disclosure will be clearly and completely described in the following with reference to the drawings in embodiments of the present disclosure. It will be apparent that the described embodiments are only parts of and not all of the embodiments of the present disclosure. Based on the embodiments in the present disclosure, all other embodiments obtained by those skilled in the art without making creative efforts fall within the scope of protection of the present application.

Transistors employed in all embodiments of the present disclosure may be thin film transistors or field effect transistors or other devices of the same characteristics. Since a first electrode and a second electrode of the transistor used here are symmetrical, the first electrode and the second electrode are interchangeable. In the embodiment of the present disclosure, in order to distinguish two poles of the transistor except the gate electrode, one of the poles is referred as the first electrode and the other is referred as the second electrode.

In addition, the transistors used in the embodiment of the present disclosure may include two types of P-type transistors and/or N-type transistors, wherein, the P-type transistors are turned on when the gate of the transistor is at a low level and are turned off when the gate of the transistor is at a high level, and the N-type transistors are turned on when the gate of the transistor is at a high level and are turned off when the gate of the transistor is at a low level.

Figure 1:
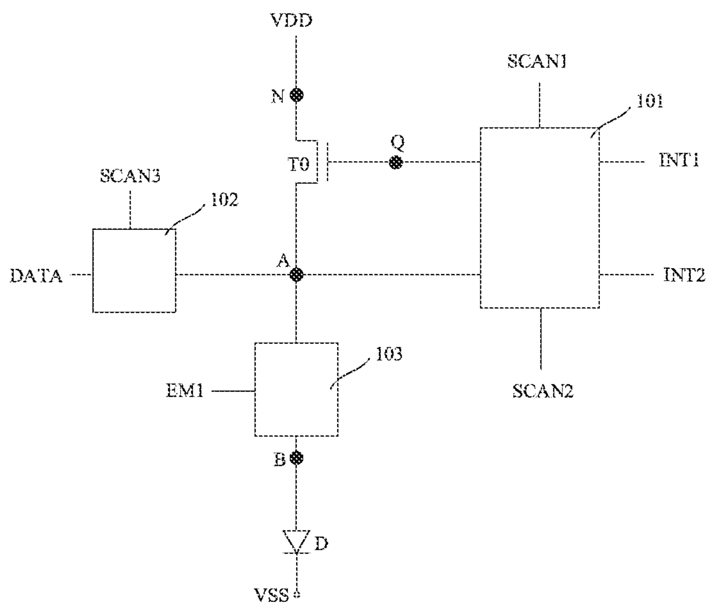
FIG. 1 is a first structural schematic diagram of a pixel driving circuit provided by an embodiment of the present disclosure.

Referring to FIG. 1, FIG. 1 is a first structural schematic view of a pixel driving circuit provided by an embodiment of the present disclosure. As shown in FIG. 1, the pixel driving circuit provided by the embodiment of the present disclosure includes a light emitting device D, a driving transistor T0, a reset module 101, a write module 102, and a first control module 103.

It should be noted that the light emitting device D may be micro light emitting diode (Micro-LED), mini light emitting diode (Mini-LED) or organic light emitting diode (OLED). In some embodiments, the light emitting device D may include a Micro-LED, a Mini-LED, or an OLED. In other embodiments, the light emitting device D may include a plurality of Micro-LEDs, a plurality of Mini-LEDs, or a plurality of OLEDs. The plurality of Micro-LEDs may be arranged in series or in parallel, and the plurality of Mini-LEDs and the plurality of OLEDs may be arranged in series or in parallel.

Specifically, a gate electrode of the driving transistor T0 is electrically connected to a first node Q, a first electrode of the driving transistor T0 is electrically connected to a second node N, the second node N is electrically connected to a second power supply terminal VDD, and a second electrode of the driving transistor T0 is electrically connected to the third node A. The reset module 101 is electrically connected to a first scanning signal terminal SCAN1, a second scanning signal terminal SCAN2, a first reset signal terminal INT1, and a second reset signal terminal INT2 respectively. The reset module 101 is further electrically connected to the first node Q and the third node A. The writing module 102 is electrically connected to a data signal terminal DATA and a third scanning signal terminal SCAN3, and is electrically connected to the third node A. The first control module 103 is electrically connected to a first control signal terminal EM1, and is electrically connected to the third node A and a fourth node B. A first terminal of the light emitting device D is electrically connected to the fourth node B, and a second terminal of the light emitting device D is electrically connected to a first power supply terminal VSS, wherein the second power supply terminal VDD and the first power supply terminal VSS are both DC voltage sources.

It should be noted that the first scanning signal terminal SCAN1 is configured to output a first scanning signal SCAN1, the second scanning signal terminal SCAN2 is configured to output a second scanning signal SCAN2, the first reset signal terminal INT1 is configured to output a first reset signal INT1, the second reset signal terminal INT2 is configured to output a second reset signal INT2, the data signal terminal DATA is configured to output a data signal DATA, the third scanning signal terminal SCAN3 is configured to output a third scanning signal SCAN3, and the first control signal terminal EM1 is configured to output a first control signal EM1.

In some embodiments, the data signal DATA includes a first potential and a second potential. The data signal DATA is switched from the first potential to the second potential during a period when the second scanning signal SCAN2 is at a high potential, and is switched from the second potential to the first potential before the first scanning signal SCAN1 is switched from a high potential to a low potential. The first potential is a low potential and a data signal is output under the low potential. The second potential is a high potential at which a first terminal of a second capacitor C2 is charged to stabilize a voltage of the second capacitor C2.

In some embodiments, the third scanning signal SCAN3 is the same signal as the first scanning signal SCAN1.

Specifically, the driving transistor T0 is configured to control a current flowing through the pixel driving circuit. The reset module 101 is configured to reset the first node Q under a control of the first scanning signal SCAN1, and the reset module 101 is further configured to reset the third node A under a control of the second scanning signal SCAN2. The writing module 102 is configured to output the data signal DATA to the first terminal of the second capacitor C2 under a control of the third scanning signal SCAN3, and to transmit the data signal DATA to the third node A through a coupling action of the second capacitor C2. The first control module 103 is configured to control a conduction or a disconnection between the third node A and the fourth node B under a control of the first control signal EM1.

It should be noted that since the third scanning signal SCAN3 and the first scanning signal SCAN1 are the same signal, a number of signals can be simplified and a crosstalk between the signals can be reduced. Of course, the third scanning signal SCAN3 and the first scanning signal SCAN1 may be different signals, so that loading on a first scanning signal line SCAN1 and a third scanning signal line SCAN3 can be reduced, and the output driving power of the first scanning signal SCAN1 and the third scanning signal SCAN3 can be improved. In addition, the first node Q, the third node A, and the fourth node B are all denoted as nodes electrically connected to corresponding devices, and here are only denoted as electrical connection relationships, wherein the first node Q, the third node A, and the fourth node B are not denoted as terminals.

Figure 2:
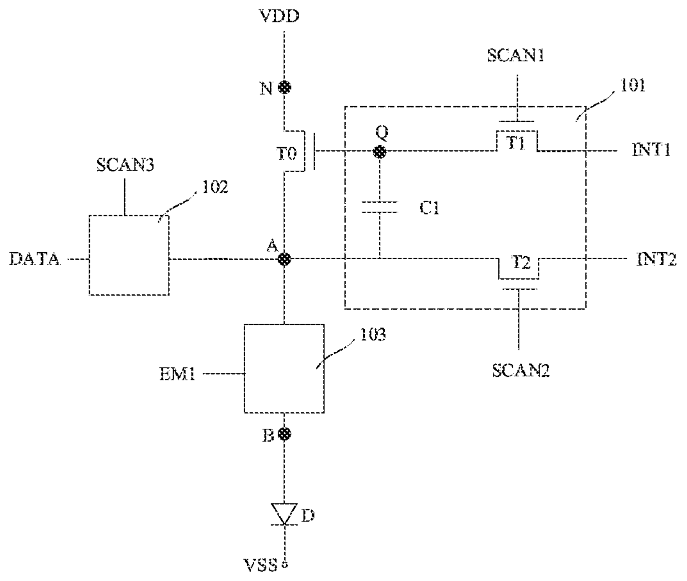
FIG. 2 is a first circuit diagram of the pixel driving circuit provided by an embodiment of the present disclosure.

In some embodiments, please refer to FIG. 2, which is a first circuit view of the pixel driving circuit provided by an embodiment of the present disclosure. As shown in FIG. 1 and FIG. 2, the reset module 101 includes a first transistor T1, a second transistor T2, and a first capacitor C1. A gate of the first transistor T1 is electrically connected to the first scanning signal terminal SCAN1 to turn on or turn off the first transistor T1 under the control of the first scanning signal SCA1. A first electrode of the first transistor T1 is electrically connected to the first reset signal terminal INT1 for receiving the first reset signal INT1, and a second electrode of the first transistor T1 is electrically connected to the first node Q. A gate of the second transistor T2 is electrically connected to the second scanning signal terminal SCAN2 to turn on or turn off the second transistor T2 under the control of the second scanning signal SCAN2. A first electrode of the second transistor T2 is electrically connected to the second reset signal terminal INT2 for receiving the second reset signal INT2. A second electrode of the second transistor T2 is electrically connected to the third node A. A first terminal of the first capacitor C1 is electrically connected to the first node Q, and a second terminal of the first capacitor C1 is electrically connected to the third node A. The driving transistor T0, the first transistor T1, and the second transistor T2 are transistors of the same type. The first capacitor C1 is configured to stabilize a voltage of the first node Q, that is, to stabilize a voltage difference between the gate electrode of the driving transistor T0 and the first electrode of the driving transistor T0.

In some embodiments, the first reset signal INT1 is the same signal as a first power supply signal VSS provided by the first power supply terminal VSS.

Figure 3:
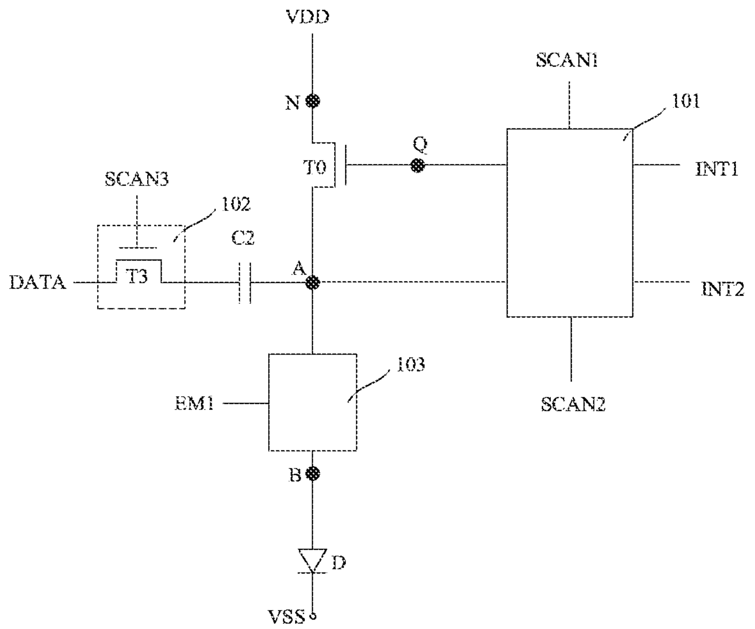
FIG. 3 is a second circuit diagram of the pixel driving circuit provided by an embodiment of the present disclosure.

In some embodiments, please refer to FIG. 3, which is a second circuit view of the pixel driving circuit provided by an embodiment of the present disclosure. Combined with FIGS. 1 and 3, the write module 102 includes a third transistor T3 and a second capacitor C2. A gate of the third transistor T3 is connected to the third scanning signal terminal SCAN3 to turn on or turn off the third transistor T3 under a control of the third scanning signal SCA3. A first electrode of the third transistor T3 is electrically connected to the data signal terminal DATA to input the data signal DATA. A second electrode of the third transistor T3 is electrically connected to a first terminal of the second capacitor C2. A second terminal of the second capacitor C2 is electrically connected to the third node A. The second capacitor C2 is configured to store a potential corresponding to the data signal DATA. Specifically, the data signal DATA includes a first potential and a second potential, and is switched from the first potential to the second potential during a period when the second scanning signal SCAN2 is at a high potential, and is switched from the second potential to the first potential before the third scanning signal SCAN3 is switched from a high potential to a low potential. The first potential is a low potential at which a data signal is output. The second potential is a high potential at which the first terminal of the second capacitor C2 is charged to stabilize the voltage of the second capacitor C2. Specifically, the data signal DATA is transmitted to the first terminal of the second capacitor C2 and transmitted to the third node A through the coupling of the second capacitor C2, so that the potentials at nodes before outputting the data signal DATA are the same high potential.

Figure 4:
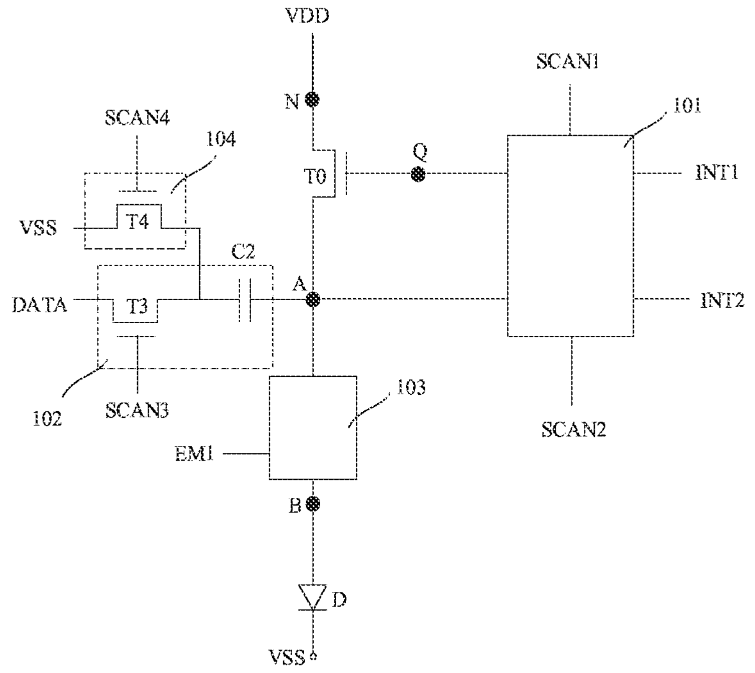
FIG. 4 is a third circuit diagram of the pixel driving circuit provided by an embodiment of the present disclosure.

In some embodiments, please refer to FIG. 4, which is a third circuit view of the pixel driving circuit provided by an embodiment of the present disclosure. As shown in FIGS. 1, 3, and 4, the pixel driving circuit further includes a second control module 104, and the second control module 104 includes a fourth transistor T4. A gate of the fourth transistor T4 is connected to the fourth scanning signal terminal SCAN4 to turn on or turn off the fourth transistor T4 under a control of the fourth scanning signal SCA4. A first electrode of the fourth transistor T4 is electrically connected to the first power supply signal terminal VSS for receiving the first power supply signal VSS. A second electrode of the fourth transistor T4 is electrically connected to the first terminal of the second capacitor C2. The second terminal of the second capacitor C2 is electrically connected to the third node A. Before the data signal DATA is written, the fourth transistor T4 transmits the first power supply signal VSS output from the first power supply terminal VSS to the first terminal of the second capacitor C2 under the control of the fourth scanning signal SCAN4, and charges the first terminal of the second capacitor C2 to stabilize the voltage of the second capacitor C2. A design of adding the fourth transistor T4 in the writing module 102 is advantageous for dividing the data signal DATA and the first power supply signal VSS into two branches for writing. Before the data signal DATA is written, the first terminal of the second capacitor C2 is charged by turning on the fourth transistor T4 to make the voltage of the second capacitor C2 to be stable, so that a threshold compensation time is no longer limited by an output time of the data signal terminal, which is beneficial to prolong a compensation time for the threshold voltage $V_{th}$ of the driving transistor T0 and to improve a threshold compensation effect. The first electrode of the fourth transistor T4 and the first electrode of the first transistor T1 are both electrically connected to the first power supply terminal VSS, thereby simplifying a circuit structure and avoiding mutual interference among a plurality of signals.

Figure 5:
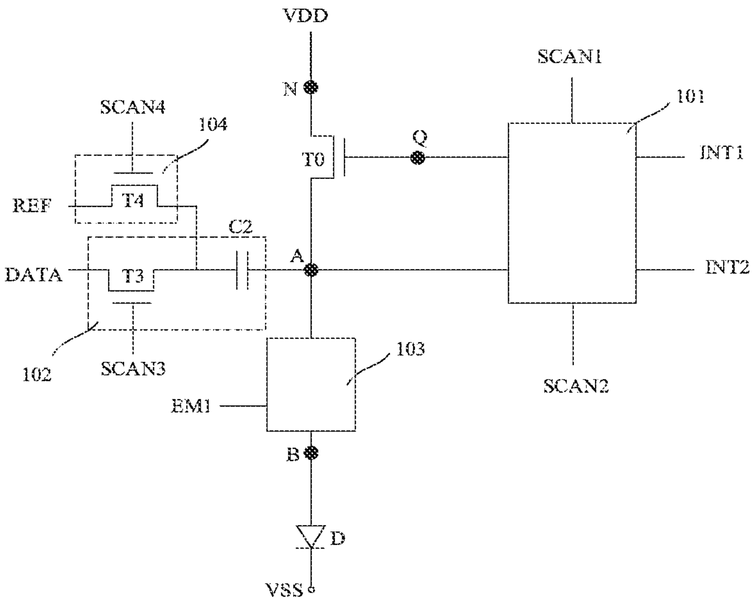
FIG. 5 is a fourth circuit diagram of the pixel driving circuit provided by an embodiment of the present disclosure.

In some embodiments, please refer to FIG. 5, which is a fourth circuit view of the pixel driving circuit provided by an embodiment of the present disclosure. As shown in FIGS. 1, 4, and 5, the second control module 104 further includes a fourth transistor T4. A gate of the fourth transistor T4 is connected to the fourth scanning signal terminal SCAN4 to turn on or turn off the fourth transistor T4 under a control of the fourth scanning signal SCA4. A first electrode of the fourth transistor T4 is electrically connected to a reference signal terminal REF for receiving a reference signal REF. A second electrode of the fourth transistor T4 is electrically connected to the first terminal of the second capacitor C2. The second terminal of the second capacitor C2 is electrically connected to the third node A. Before the data signal DATA is written, the fourth transistor T4 transmits the reference signal REF to the first terminal of the second capacitor C2 under the control of the fourth scanning signal SCAN4, and charges the first terminal of the second capacitor C2 to stabilize the voltage of the second capacitor C2. A design of adding the fourth transistor T4 in the writing module 102 is advantageous for dividing the data signal DATA and the reference signal REF into two branches for writing. Before the data signal DATA is written, the first terminal of the second capacitor C2 is charged by turning on the fourth transistor T4 to make the voltage of the second capacitor C2 to be stable, so that a threshold compensation time is no longer limited by an output time of the data signal terminal, which is beneficial to prolong a compensation time for the threshold voltage $V_{th}$ of the driving transistor T0 and to improve a threshold compensation effect.

Figure 6:
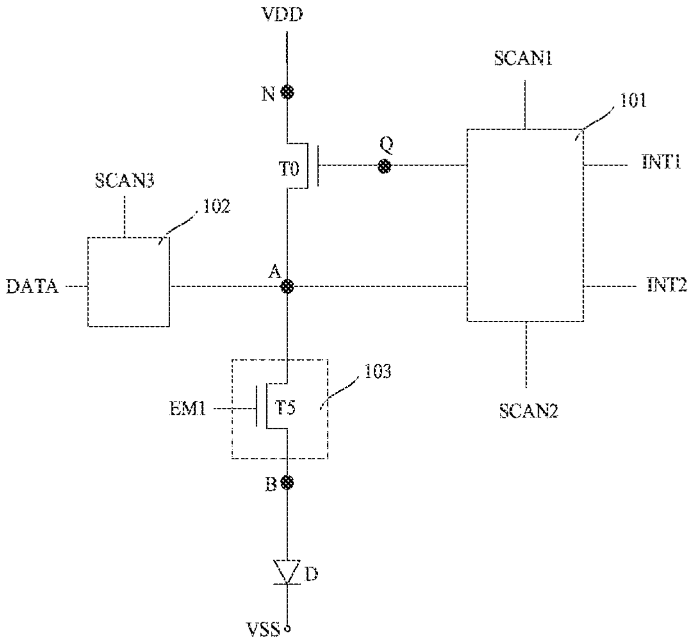
FIG. 6 is a fifth circuit diagram of the pixel driving circuit provided by an embodiment of the present disclosure.

In some embodiments, please refer to FIG. 6, which is a fifth circuit view of the pixel driving circuit provided by an embodiment of the present disclosure. As shown in FIGS. 1 and 6, the first control module 103 includes a fifth transistor T5, a gate of the fifth transistor T5 is electrically connected to a first control signal terminal EM1, a first electrode of the fifth transistor T5 is electrically connected to the third node A, and a second electrode of the fifth transistor T5 is electrically connected to the fourth node B. It should be noted that a specific circuit structure of the first control module in the pixel driving circuit provided by the embodiment of the present disclosure is only an example and it can be understood that the first control module may be formed by a plurality of transistors in series.

Figure 7:
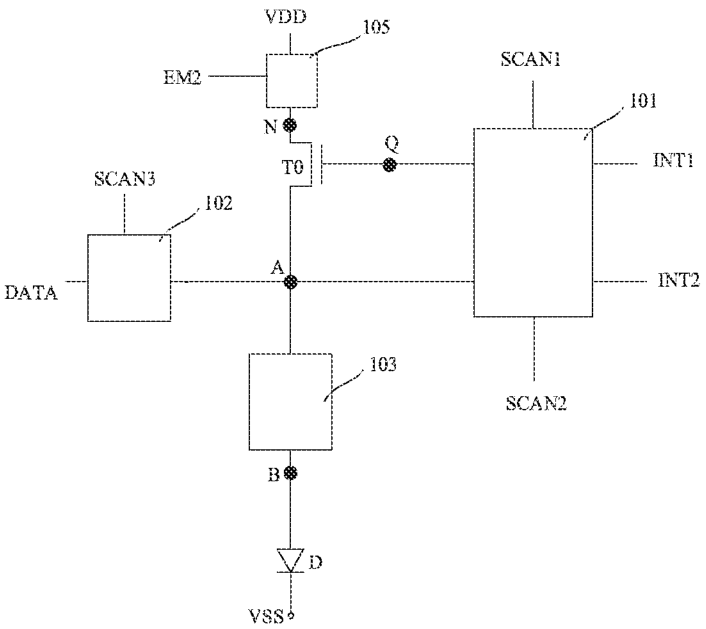
FIG. 7 is a second structural schematic diagram of a pixel driving circuit provided by an embodiment of the present disclosure.

In some embodiments, please refer to FIG. 7, which is a second structural schematic view of a pixel driving circuit provided by an embodiment of the present disclosure. As shown in FIGS. 1 and 7, the pixel driving circuit further includes a third control module 105. The third control module 105 is electrically connected to a second control signal terminal EM2 to turn on or turn off the third control module 105 under a control of the second control signal terminal EM2. The third control module 105 is further electrically connected to the second power supply terminal VDD and the second node N. The third control module 105 is configured to control a conduction or a disconnection between the second power supply terminal VDD and the second node N. Other modules are consistent with those in FIG. 1, so they will not be repeated here.

Figure 8:
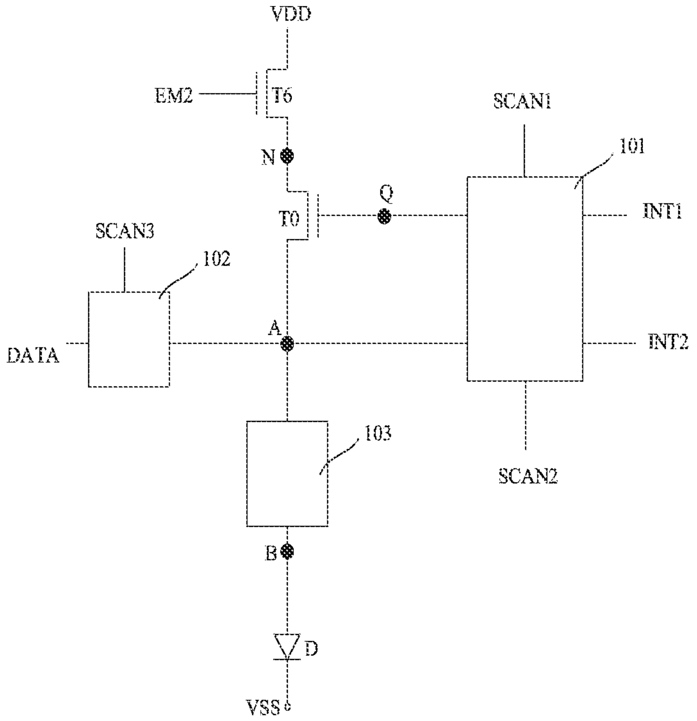
FIG. 8 is a sixth circuit diagram of the pixel driving circuit provided by an embodiment of the present disclosure.

In some embodiments, please refer to FIG. 8, which is a sixth circuit view of the pixel driving circuit provided by an embodiment of the present disclosure. As shown in FIGS. 1, 7, and 8, the third control module 105 includes a sixth transistor T6, a gate of the sixth transistor T6 is electrically connected to the second control signal terminal EM2, a first electrode of the sixth transistor T6 is electrically connected to the second power supply terminal VDD, and a second electrode of the sixth transistor T6 is electrically connected to the second node N. Under the control of the second control signal EM2, the sixth transistor T6 ensures that after the data signal DATA is written, the second power supply terminal VDD does not charge the first electrode of the driving transistor T0 again, and the second transistor T2 does not continue to charge the second electrode of the driving transistor T0, so that the voltage difference between the gate of the driving transistor T0 and the first electrode of the driving transistor T0, and he voltage difference between the gate of the driving transistor T0 and the second electrode of the driving transistor T0 can be more stable.

It should be noted that the driving transistor T0, the first transistor T1, the second transistor T2, the third transistor T3, the fourth transistor T4, the fifth transistor T5, and the sixth transistor T6 may be one or more types of a low-temperature polysilicon thin film transistor, an oxide semiconductor thin film transistors, and an amorphous silicon thin film transistor. Furthermore, the driving transistor T0, the first transistor T1, the second transistor T2, the third transistor T3, the fourth transistor T4, the fifth transistor T5, and the sixth transistor T6 are all transistors of the same type, and preferably are all N-type transistors or P-type transistors.

Figure 9:
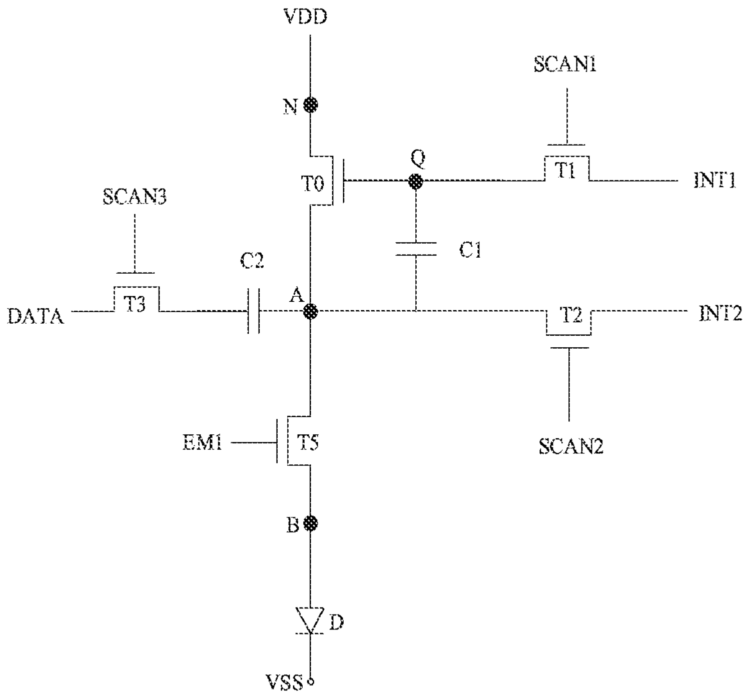
FIG. 9 is a seventh circuit diagram of the pixel driving circuit provided by an embodiment of the present disclosure.

Furthermore, embodiments of the present disclosure will describe a complete circuit of the pixel driving circuit. Referring to FIG. 9, FIG. 9 is a seventh circuit view of the pixel driving circuit provided by an embodiment of the present disclosure. As shown in FIG. 9, the pixel driving circuit provided by the embodiment of the present disclosure includes a light emitting device D, a driving transistor T0, a first transistor T1, a second transistor T2, a third transistor T3, a fifth transistor T5, a first capacitor C1 and a second capacitor C2.

The transistors in the pixel driving circuit provided by the embodiment of the disclosure are the same type of transistors, which are beneficial to avoid an influence of differences between transistors of different types onto the pixel driving circuit.

The gate of the driving transistor T0 is electrically connected to the first node Q, the first electrode of the driving transistor T0 is electrically connected to the second node N, i.e., the second power supply terminal VDD, and the second electrode of the driving transistor T0 is electrically connected to the third node A. The first terminal of the light emitting device D is electrically connected to the fourth node B, and the second end of the light emitting device D is electrically connected to the first power supply terminal VSS. The gate electrode of the first transistor T1 is electrically connected to the first scanning signal SCAN1, the first electrode of the first transistor T1 is electrically connected to the first reset signal terminal INT1, and the second electrode of the first transistor T1 is electrically connected to the first node Q. The gate electrode of the second transistor T2 is electrically connected to the second scanning signal terminal SCAN2, the first electrode of the second transistor T2 is electrically connected to the second reset signal terminal INT2, and the second electrode of the second transistor T2 is electrically connected to the third node A. The first terminal of the first capacitor C1 is electrically connected to the first node Q, and the second terminal of the first capacitor C1 is electrically connected to the third node A. The gate of the third transistor T3 is electrically connected to the third scanning signal SCAN3, the first electrode of the third transistor T3 is electrically connected to the DATA signal terminal DATA, and the second electrode of the third transistor T3 is electrically connected to the first terminal of the second capacitor. The second terminal of the second capacitor is electrically connected to the third node A. The gate of the fifth transistor T5 is electrically connected to the first control signal terminal EM1, the first electrode of the fifth transistor T5 is electrically connected to the third node A, and the second electrode of the fifth transistor T5 is electrically connected to the fourth node B.

It should be noted that since the third scanning signal SCAN3 and the first scanning signal SCAN1 are the same signal, this design may simplify the number of signals and reduce the crosstalk between the signals. Of course, the third scanning signal SCAN3 and the first scanning signal SCAN1 may be different signals, so that loadings respectively on the first scanning signal line SCAN1 and the third scanning signal line SCAN3 can be reduced, and the output driving power of the first scanning signal SCAN1 and the third scanning signal SCAN3 can be improved.

Figure 10:
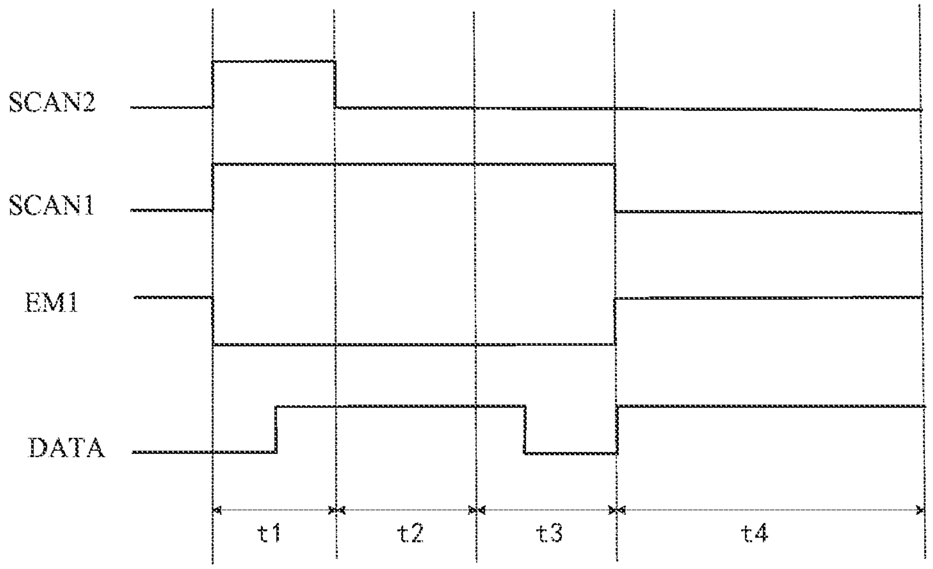
FIG. 10 is a timing diagram of the pixel driving circuit shown in FIG. 1.

Please refer to FIG. 10, which is a timing sequence view of the pixel driving circuit shown in FIG. 1. As shown in FIG. 1, FIG. 9 and FIG. 10, the driving timing of the pixel driving circuit provided by the embodiment of the present disclosure includes a reset phase t1, a compensation phase t2, a data writing phase t3, and a light emitting phase t4.

In a reset phase t1, both the first scanning signal SCAN1 and the second scanning signal SCAN2 are at a high potential, and the first transistor T1 is turned on under the control of the first scanning signal SCAN1 to reset the first node Q, so that a gate voltage of the driving transistor T0 is reset to the first reset voltage $V_{INT1}$ provided by the first reset signal INT1. The second transistor T2 is turned on under the control of the second scanning signal SCAN2 to reset the third node A, so that a second electrode voltage of the driving transistor T0 is reset to the second reset voltage $V_{INT2}$ provided by the second reset signal INT2, and the second reset voltage $V_{INT2}$ is smaller than the voltage difference between the first reset voltage $V_{INT1}$ and the threshold voltage $V_{th}$ of the driving transistor T0.

In a compensation phase t2, the second scanning signal SCAN2 is at a low potential, the first scanning signal SCAN1 maintains a high potential, the first transistor T1 remains on, the first reset signal INT1 is continuously output to the first node Q, a voltage difference between the first node Q and the third node A is larger than the threshold voltage $V_{th}$ of the driving transistor T0, the driving transistor T0 is turned on, the second power supply terminal VDD charges the third node A until the voltage difference between the first node Q and the third node A is equal to the threshold voltage $V_{th}$ of the driving transistor T0, and the threshold voltage $V_{th}$ is stored in the first capacitor C1.

In a data writing phase t3, the second scanning signal SCAN2 is maintained at a low potential and the first scanning signal SCAN1 is maintained at a high potential, at which the data signal DATA is switched from the second potential to the first potential to output the data signal DATA. Due to a coupling effect of the second capacitor C2, the data signal DATA is transmitted to the third node A, so that a potential $V_A$ of the third node A satisfies: $V_A=V_{VSS}-V_{th}+(V_{REF}-V_{DATA})$ (C2/(C2+C1)).

Moreover, in some embodiments, the first reset signal INT1 and the first power supply signal VSS are the same signal, that is, a potential of the first node Q is the first power supply voltage $V_{VSS}$, so the first capacitor C1 stores the voltage value. That is, the voltage difference $V_{gs}$ between the gate electrode of the driving transistor TO and the second electrode of the driving transistor T0 is $V_{th}+(V_{DATA}-V_{REF})$ (C2/(C1+C2)), and the first capacitor C1 may play a role in stabilizing the voltage.

In the light emitting phase t4, the first control signal EM1 is at a high potential, and the light emitting device D emits light. Since $V_{gs}$ is stored in the first capacitor, so that, in the light emitting phase t4, $V_{gs}-V_{th}=(V_{DATA}-V_{REF})$ (C2/(C1+C2)). That is, a driving current $I_{oled}$ is independent of the drift of the threshold voltage $V_{th}$, and the threshold voltage $V_{th}$ compensation function of the driving transistor T0 is realized in the light emitting phase.

The pixel driving circuit provided by the present disclosure includes the light emitting device D, the driving transistor T0, the reset module 101, the writing module 102, and the first control module 103. The pixel driving circuit may compensate the drift of the threshold voltage $V_{th}$ of the driving transistor T0, improve the luminous uniformity of the light emitting device, and further improve the image quality.

Figure 11:
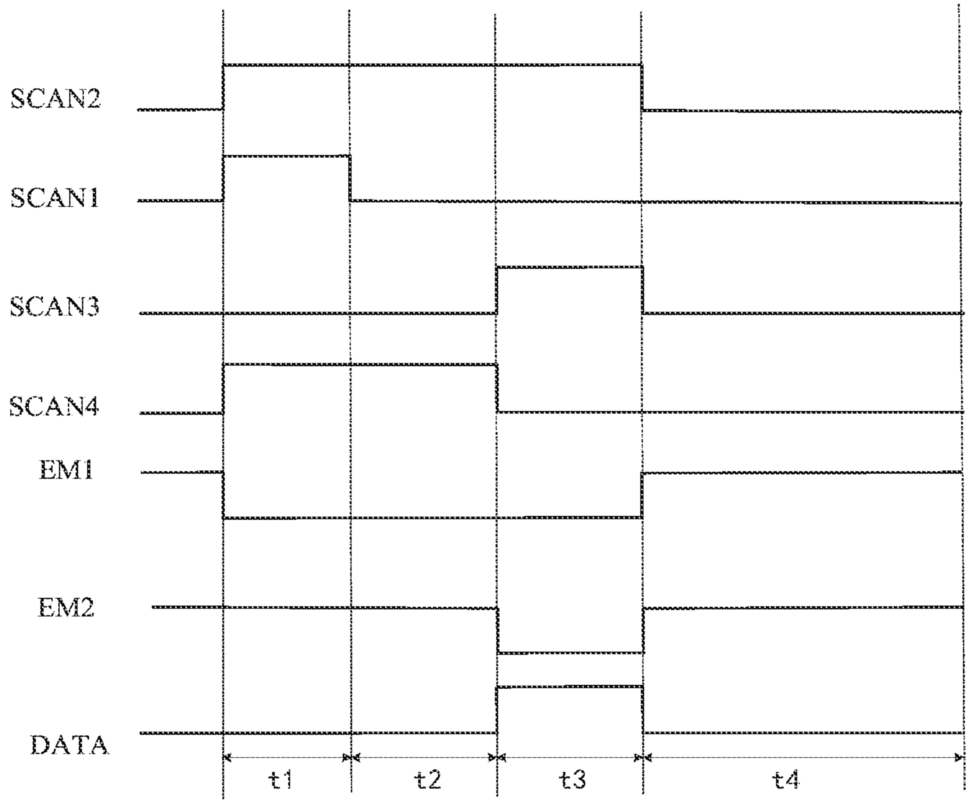
FIG. 11 is a timing diagram of the pixel driving circuit shown in FIG. 4.

Please refer to FIG. 11, which is a timing sequence view of the pixel driving circuit shown in FIG. 5. As shown in FIG. 5, FIG. 6, FIG. 10, and FIG. 11, the driving timing of the pixel driving circuit provided by the embodiment of the present disclosure includes a reset phase t1, a compensation phase t2, a data writing phase t3, and a light emitting phase t4.

In the reset phase t1 and the compensation phase t2, the second control signal terminal EM2 maintains a high potential, and the fourth transistor T4 is turned on under the control of the second control signal EM2.

In a compensation phase t2, the second scanning signal SCAN2 is at a low potential, the first scanning signal SCAN1 maintains a high potential, the first transistor T1 remains on, the first reset signal INT1 is continuously output to the first node Q and make the voltage difference between the first node Q and the third node A to be larger than the threshold voltage $V_{th}$ of the driving transistor T0, the driving transistor T0 is turned on, the second power supply terminal VDD charges the third node A until the voltage difference between the first node Q and the third node A is equal to the threshold voltage $V_{th}$ of the driving transistor T0, and the threshold voltage $V_{th}$ is stored in the first capacitor C1.

In a data writing phase t3, the second scanning signal SCAN2 is maintained at a low potential, and the first scanning signal SCAN1 and the third scanning signal SCAN3 are both maintained at a high potential. At this timing, the data signal DATA is switched from the second potential to the first potential to output the data signal DATA. Due to a coupling effect of the second capacitor C2, the data signal DATA is transmitted to the third node A. The second control signal EM2 is switched to a low potential, and the sixth transistor T6 is turned off under the control of the second control signal EM2, so as to ensure that the second power supply terminal VDD and the second reset signal INT2 do not continue to charge the third node A after the data signal DATA is written, which is beneficial to improving the stability of the voltage difference $V_{gs}$ between the gate electrode of the driving transistor T0 and the second electrode of the driving transistor T0.

It should be noted that the third scanning signal SCAN3 and the first scanning signal SCAN1 are the same signal, so that a number of signals may be simplified and a crosstalk between signals can be reduced. Of course, the third scanning signal SCAN3 and the first scanning signal SCAN1 may be different signals, so that the loadings respectively on the first scanning signal line SCAN1 and the third scanning signal line SCAN3 can be reduced, and the output driving power of the first scanning signal SCAN1 and the third scanning signal SCAN3 can be improved.

In the light emitting phase t4, the first control signal EM1 and the second control signal EM2 are both at a high potential, the fifth transistor T5 is turned on under the control of the first control signal EM1, the fourth transistor T4 is turned on under the control of the second control signal EM2, and the light emitting device D emits light.

The pixel driving circuit provided by the present disclosure includes the light emitting device D, the driving transistor T0, the reset module 101, the writing module 102, and the first control module 103. The pixel driving circuit may compensate the drift of the threshold voltage $V_{th}$ of the driving transistor T0, improve the luminous uniformity of the light emitting device, and further improve the image quality.

Figure 12:
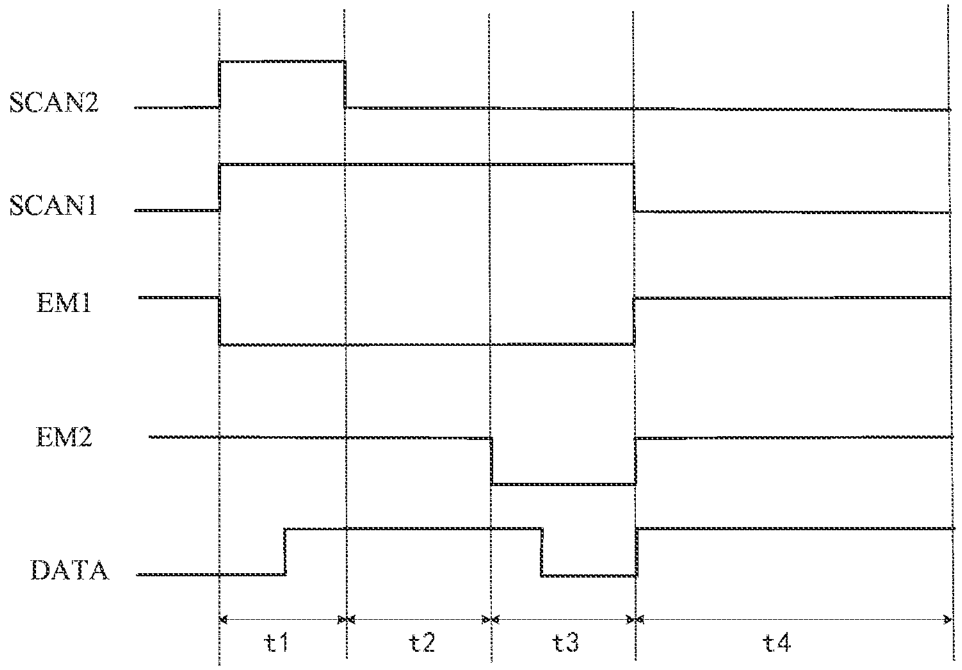
FIG. 12 is a timing diagram of the pixel driving circuit shown in FIG. 7.

Please refer to FIG. 12, which is a timing sequence view of the pixel driving circuit shown in FIG. 7. As shown in FIG. 7, FIG. 8, FIG. 10, and FIG. 12, the driving timing of the pixel driving circuit provided by the embodiment of the present disclosure includes a reset phase t1, a compensation phase t2, a data writing phase t3, and a light emitting phase t4.

In the reset phase t1, the first scanning signal SCAN1, the second scanning signal SCAN2, the fourth scanning signal SCAN4, and the second control signal EM2 are all at a high potential.

In a compensation phase t2, the second scanning signal SCAN2, the fourth scanning signal SCAN4, and the second control signal EM2 maintain a high potential.

In a data writing phase t3, the second scanning signal SCAN2 and the third control signal EM3 are both at a high potential.

In the light emitting phase t4, the first scanning signal SCAN1 and the second control signal EM2 are both at a high potential, and the light emitting device D emits light.

In particular, in some embodiments, the reference signal REF is the same as the first power supply signal VSS, and therefore, in the reset phase t1 and the compensation phase t2, the fifth transistor T5 is turned on under the control of the fourth scanning signal SCAN4, so that the first power supply voltage $V_{VSS}$ output from the first power supply terminal VSS is transmitted to the first terminal of the second capacitor C2, and the first power supply voltage $V_{VSS}$ is transmitted to the third node A through the coupling action of the second capacitor C2.

In the data writing phase T3, the third transistor T3 is turned on under the control of the third scanning signal SCAN3, and the fifth transistor T5 is turned off under the control of the fourth scanning signal SCAN4, so that the data signal $V_{DATA}$ is transmitted to the first terminal of the second capacitor C2, and the data signal $V_{DATA}$ is transmitted to the third node A through the coupling action of the second capacitor C2.

By dividing the data signal DATA and the second power supply terminal VSS into two branches and performing a writing in different phases, the first terminal of the second capacitor may be charged through the fourth transistor T4 before the data signal DATA is written, so as to stabilize the voltage of the second capacitor C2. Furthermore, the time of threshold compensation is no longer limited by the time of outputting the data signal terminal, which is beneficial to prolong the compensation time for the threshold voltage $V_{th}$ of the driving transistor T0, so as to improve the threshold compensation effect.

Figure 13:
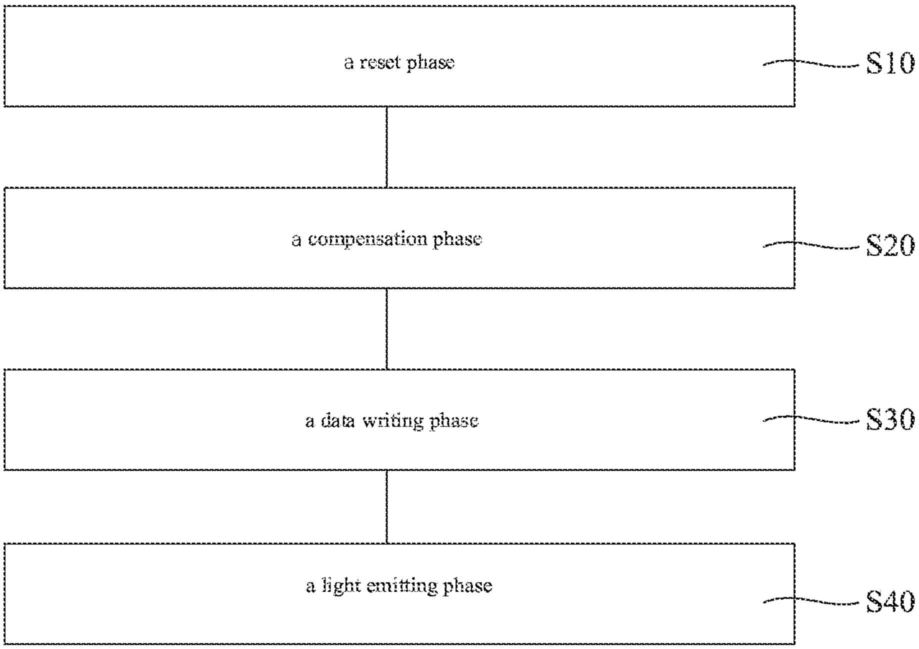
FIG. 13 is a flow chart of a driving method provided by an embodiment of the present disclosure.

The present disclosure also provides a driving method. Please refer to FIG. 13, which is a flow view of a driving method provided by an embodiment of the present disclosure. The driving method includes the following steps:

S10: a reset phase, resetting the first node Q according to a first reset signal INT1 under a control of a first scanning signal SCAN1 and resetting the third node A according to a second reset signal INT2 under a control of a second scanning signal SCAN2 by the reset module 101.

S20: a compensation phase, continuously outputting the first reset signal INT1 to the first node Q by means of the reset module 101 under the control of the first scanning signal SCAN1 to make a voltage difference between the first node Q and the third node A to be larger than the threshold voltage of the driving transistor T0, so as to turn on the driving transistor T0 and to charge the third node A by the second power supply terminal VDD until the voltage difference between the first node Q and the third node A is equal to the threshold voltage of the driving transistor T0.

S30: a data writing phase, outputting the data signal DATA to the third node A by means of the writing module 102 under the control of the third scanning signal SCAN3.

S40: a light emitting phase, emitting light by means of the light emitting device D.

Figure 14:
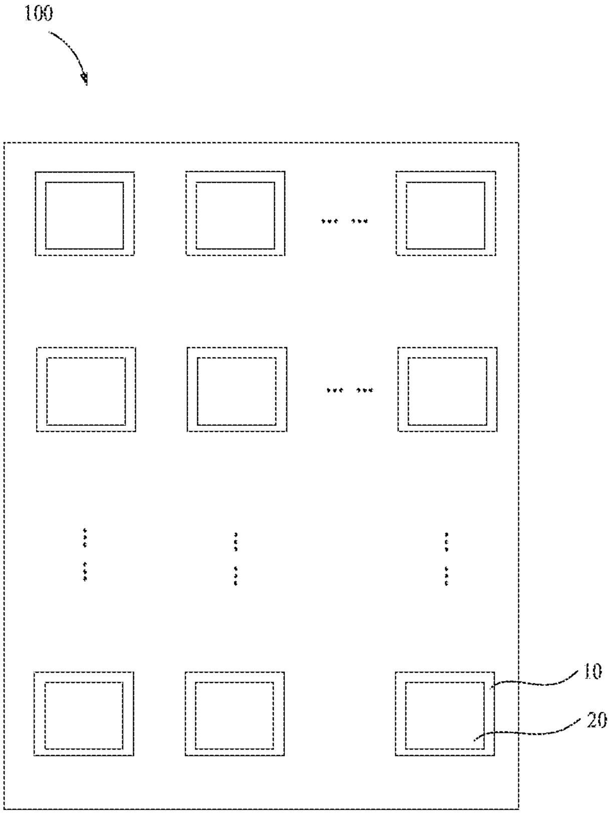
FIG. 14 is a structural schematic diagram of the display panel provided by the embodiment of the present disclosure.

Please refer to FIG. 14, which is structural schematic diagram of the display panel provided by the embodiment of the present disclosure. The embodiment of the present disclosure also provides a display panel 100. The display panel 100 includes a plurality of pixels 20 arranged in an array, and each pixel 11 includes the pixel driving circuit 10 mentioned above. The description of the pixel driving circuit 10 may be referred to the above in detail, and will not be repeated here.

The pixel driving circuit provided by the present disclosure includes a light emitting device D, a driving transistor T0, a reset module 101, a writing module 102 and a first control module 103. The pixel driving circuit may compensate the drift of the threshold voltage $V_{th}$ of the driving transistor T0, improve the luminous uniformity of the light emitting device, and further improve the image quality.

The foregoing is a preferred embodiment of the present disclosure, and it should be noted that, to those of ordinary skill in the art, several modifications and embellishments may be made without departing from the principles set forth in the present disclosure, and such modifications and embellishments are also to be considered within the scope of the present.

What is claimed is:

1. A pixel driving circuit comprising:

a driving transistor, wherein a gate electrode of the driving transistor is electrically connected to a first node, a first electrode of the driving transistor is electrically connected to a second node, and a second electrode of the driving transistor is directly and electrically connected to a third node;

a reset module electrically connected to a first scanning signal terminal, a second scanning signal terminal, a first reset signal terminal, and a second reset signal terminal respectively, wherein the reset module is electrically connected to the first node and the third node and is configured to reset the first node and the third node; the reset module comprises a first transistor, a second transistor, and a first capacitor; a gate electrode of the first transistor is electrically connected to the first scanning signal terminal, a first electrode of the first transistor is electrically connected to the first reset signal terminal, and a second electrode of the first transistor is electrically connected to the first node;

a gate electrode of the second transistor is electrically connected to the second scanning signal terminal, a first electrode of the second transistor is electrically connected to the second reset signal terminal, and a second electrode of the second transistor is directly and electrically connected to the third node; and a first terminal of the first capacitor is electrically connected to the first node, and a second terminal of the first capacitor is directly and electrically connected to the third node; a second reset voltage provided by the second reset signal terminal is smaller than a voltage difference between a first reset voltage provided by the first reset signal terminal and a threshold voltage of the driving transistor;

a writing module respectively connected to a data signal terminal and a third scanning signal terminal, wherein the writing module is directly and electrically connected to the third node and is configured to output a data signal to the third node;

a first control module connected to a first control signal terminal; wherein the first control module is directly and electrically connected to the third node and the fourth node, and is first control module control a conduction or a disconnection between the third node and the fourth node; and a light emitting device, wherein a first terminal of the light emitting device is directly and electrically connected to a fourth node, and a second terminal of the light emitting device is electrically connected to a first power supply terminal.

2. The pixel driving circuit of claim 1, wherein the writing module comprises a third transistor and a second capacitor, a gate electrode of the third transistor is electrically connected to the third scanning signal terminal, a first electrode of the third transistor is electrically connected to the data signal terminal, and a second electrode of the third transistor is electrically connected to a first terminal of the second capacitor; and wherein a second terminal of the second capacitor is electrically connected to the third node.

3. The pixel driving circuit of claim 1, wherein the first control module comprises a fifth transistor, a gate of the fifth transistor is electrically connected to the first control signal terminal, a first electrode of the fifth transistor is electrically connected to the third node, and a second electrode of the fifth transistor is electrically connected to the fourth node.

4. A driving method of a pixel driving circuit, the pixel driving circuit comprising: a driving transistor, wherein a gate electrode of the driving transistor is electrically connected to a first node, a first electrode of the driving transistor is electrically connected to a second node, and a second electrode of the driving transistor is directly and electrically connected to a third node; a reset module electrically connected to a first scanning signal terminal, a second scanning signal terminal, a first reset signal terminal, and a second reset signal terminal respectively, wherein the reset module is electrically connected to the first node and the third node and is configured to reset the first node and the third node; the reset module comprises a first transistor, a second transistor, and a first capacitor; a gate electrode of the first transistor is electrically connected to the first scanning signal terminal, a first electrode of the first transistor is electrically connected to the first reset signal terminal, and a second electrode of the first transistor is electrically connected to the first node; a gate electrode of the second transistor is electrically connected to the second scanning signal terminal, a first electrode of the second transistor is electrically connected to the second reset signal terminal, and a second electrode of the second transistor is directly and electrically connected to the third node; and a first terminal of the first capacitor is electrically connected to the first node, and a second terminal of the first capacitor is directly and electrically connected to the third node; a second reset voltage provided by the second reset signal terminal is smaller than a voltage difference between a first reset voltage provided by the first reset signal terminal and a threshold voltage of the driving transistor; a writing module respectively connected to a data signal terminal configured to output data signal and a third scanning signal terminal, wherein the writing module is directly and electrically connected to the third node and is configured to output a data signal to the third node; a first control module connected to a first control signal terminal, wherein the first control module is directly and electrically connected to the third node and the fourth node, and is first control module control a conduction or a disconnection between the third node and the fourth node; and a light emitting device, wherein a first terminal of the light emitting device is directly and electrically connected to a fourth node, and a second terminal of the light emitting device is electrically connected to a first power supply terminal;

wherein the driving method comprises:

in a reset phase, resetting the first node according to a first reset signal under a control of a first scanning signal and resetting the third node according to a second reset signal under a control of a second scanning signal by the reset module;

in a compensation phase, continuously outputting the first reset signal to the first node by means of the reset module under the control of the first scanning signal to make a voltage difference between the first node and the third node to be larger than the threshold voltage of the driving transistor, so as to turn on the driving transistor and to charge the third node by the second power supply terminal until the voltage difference between the first node and the third node is equal to the threshold voltage of the driving transistor;

in a data writing phase, outputting the data signal to the third node by means of the writing module under the control of the third scanning signal; and in a light emitting phase, emitting light by means of the light emitting device.

5. The driving method of the pixel driving circuit of claim 4, wherein the first scanning signal and the third scanning signal are the same signal.

6. The driving method of the pixel driving circuit of claim 4, wherein the data signal comprises a first potential and a second potential, the data signal is switched from the first potential to the second potential in the reset phase, and the data signal is switched from the second potential to the first potential in the data writing phase.

7. A display panel, comprising a plurality of pixels arranged in an array, wherein each pixel comprises a pixel driving circuit; the pixel driving circuit comprising:

a driving transistor, wherein a gate electrode of the driving transistor is electrically connected to a first node, a first electrode of the driving transistor is electrically connected to a second node, and a second electrode of the driving transistor is directly and electrically connected to a third node;

a reset module electrically connected to a first scanning signal terminal, a second scanning signal terminal, a first reset signal terminal, and a second reset signal terminal respectively, wherein the reset module is electrically connected to the first node and the third node and is configured to reset the first node and the third node; the reset module comprises a first transistor, a second transistor, and a first capacitor; a gate electrode of the first transistor is electrically connected to the first scanning signal terminal, a first electrode of the first transistor is electrically connected to the first reset signal terminal, and a second electrode of the first transistor is electrically connected to the first node; a gate electrode of the second transistor is electrically connected to the second scanning signal terminal, a first electrode of the second transistor is electrically connected to the second reset signal terminal, and a second electrode of the second transistor is directly and electrically connected to the third node; and a first terminal of the first capacitor is electrically connected to the first node, and a second terminal of the first capacitor is directly and electrically connected to the third node; a second reset voltage provided by the second reset signal terminal is smaller than a voltage difference between a first reset voltage provided by the first reset signal terminal and a threshold voltage of the driving transistor;

a writing module respectively connected to a data signal terminal and a third scanning signal terminal, wherein the writing module is directly and electrically connected to the third node and is configured to output a data signal to the third node;

a first control module connected to a first control signal terminal, wherein the first control module is directly and electrically connected to the third node and the fourth node, and is first control module control a conduction or a disconnection between the third node and the fourth node; and a light emitting device, wherein a first terminal of the light emitting device is directly and electrically connected to a fourth node, and a second terminal of the light emitting device is electrically connected to a first power supply terminal.

8. The display panel of claim 7, wherein the writing module comprises a third transistor and a second capacitor, a gate electrode of the third transistor is electrically connected to the third scanning signal terminal, a first electrode of the third transistor is electrically connected to the data signal terminal, and a second electrode of the third transistor is electrically connected to a first terminal of the second capacitor; and wherein a second terminal of the second capacitor is electrically connected to the third node.

9. The display panel of claim 7, wherein the first control module comprises a fifth transistor, a gate of the fifth transistor is electrically connected to the first control signal terminal, a first electrode of the fifth transistor is electrically connected to the third node, and a second electrode of the fifth transistor is electrically connected to the fourth node.

* * * * *